United States Patent
Vieillard et al.

(10) Patent No.: US 9,197,088 B2
(45) Date of Patent: Nov. 24, 2015

(54) MODULE FOR CONVERTING VOLTAGE BETWEEN A HIGH-VOLTAGE ELECTRICAL NETWORK OF AN AIRCRAFT AND AN ENERGY STORAGE ELEMENT

(75) Inventors: Sébastien Vieillard, La Chapelle Gauthier (FR); Laurent Bernard Brosson, Antony (FR); Charif Karimi, Orsay (FR); Marc Henri Yves Pontrucher, Paris (FR)

(73) Assignees: LABINAL POWER SYSTEMS, Blagnac (FR); SAGEM DEFENSE SECURITE, Paris (FR); MESSIER-BUGATTI-DOWTY, Velizy-Villacoublay (FR)

( * ) Notice: Subject to any disclaimer, the term of this patent is extended or adjusted under 35 U.S.C. 154(b) by 203 days.

(21) Appl. No.: 13/976,215

(22) PCT Filed: Dec. 22, 2011

(86) PCT No.: PCT/FR2011/053174
§ 371 (c)(1),
(2), (4) Date: Jun. 26, 2013

(87) PCT Pub. No.: WO2012/089973
PCT Pub. Date: Jul. 5, 2012

(65) Prior Publication Data
US 2013/0285615 A1 Oct. 31, 2013

(30) Foreign Application Priority Data
Dec. 28, 2010 (FR) ...................................... 10 61326

(51) Int. Cl.
*H02J 7/00* (2006.01)
*H02J 7/34* (2006.01)
(Continued)

(52) U.S. Cl.
CPC .............. *H02J 7/0068* (2013.01); *H02J 7/345* (2013.01); *H02J 4/00* (2013.01); *H02M 3/1584* (2013.01)

(58) Field of Classification Search
CPC ................................. H02J 7/345; F02P 15/12
USPC ......................................................... 320/128
See application file for complete search history.

(56) References Cited

U.S. PATENT DOCUMENTS 5,512,811 A * 4/1996 Latos et al. ...................... 322/10
5,850,113 A * 12/1998 Weimer et al. ................. 307/125
(Continued)

FOREIGN PATENT DOCUMENTS

EP 2 221 952 8/2010

OTHER PUBLICATIONS

Rafal, K. et al. "Hybridization of an aircraft emergency electrical network: Experimentation and benefits validation", Vehicle Power and Propulsion Conference (VPPC), 2010 IEEE, p. 1-6, (Sep. 1, 2011), (XP031929123).

(Continued)

*Primary Examiner* — Suchin Parihar
(74) *Attorney, Agent, or Firm* — Oblon, McClelland, Maier & Neustadt, L.L.P.

(57) ABSTRACT

A module converting voltage between a high-voltage electrical network and at least one energy storage element an aircraft, the conversion module configured to reversibly convert between a DC voltage of the high-voltage electrical network and a DC voltage of the energy storage element, the DC voltage of the energy storage element floating relative to the DC voltage of the high-voltage electrical network and centered relative to the mass of the aircraft, the module including an input module including two filters each capable of receiving a DC voltage, a first arm and a second arm including switches, and a mechanism controlling the switches, operating per cycle of a switching period and capable of controlling at least one first switch and at least one second switch identically but offset by a half-period, whereby the first switch is open when the second switch is closed and vice versa.

12 Claims, 5 Drawing Sheets

(51) Int. Cl.
*H02J 4/00* (2006.01)
*H02M 3/158* (2006.01)

(56) References Cited

U.S. PATENT DOCUMENTS

| | | | | |
|---|---|---|---|---|
| 5,864,221 | A * | 1/1999 | Downs et al. | 320/134 |
| 5,980,095 | A | 11/1999 | Asplund et al. | |
| 2010/0080030 | A1 * | 4/2010 | Wiegman et al. | 363/131 |
| 2010/0083669 | A1 * | 4/2010 | Foster et al. | 60/802 |
| 2011/0273012 | A1 * | 11/2011 | Tardy | 307/9.1 |
| 2014/0268943 | A1 * | 9/2014 | Phadke | 363/55 |

OTHER PUBLICATIONS

Jovcic, "Bidirectional, High-Power DC Transformer", IEEE Transactions on Power Delivery, vol. 24, No. 4, pp. 2276-2283, (Oct. 1, 2009), (XP011276520).

Vinnikov, D. et al. "New Bi-Directional DC/DC Converter for Supercapacitor Interfacing in High-Power Applications", 14th International Power Electronics and Motion Control Conference (EPE/PEMC), pp. T11-T38, (Sep. 6, 2010),(XP031778639).

International Search Report Issued Oct. 30, 2012 in PCT/FR11/053174 Filed Dec. 22, 2011.

* cited by examiner

MODULE FOR CONVERTING VOLTAGE BETWEEN A HIGH-VOLTAGE ELECTRICAL NETWORK OF AN AIRCRAFT AND AN ENERGY STORAGE ELEMENT

The invention relates to the storage of energy, and more particularly the storage of energy in aircraft.

Nowadays, an aircraft, such as for example an airplane, comprises electrical systems, linked into electrical networks, for supplying operating modules of the airplane, such as for example electric actuators. Such electric actuators are to be found especially in flight controls and landing gear. The main electrical network of an airplane operates for example at 115/200 V under AC voltage and AC current (Alternating Current (AC)) and the backup network operates for example under DC voltage, for example between 135 V (or 270 V) and −135 V (respectively −270 V), under direct current (Direct Current (DC)), thus constituting a high-voltage DC network (High Voltage Direct Current (HVDC)).

Converters are used in certain types of airplane to convert the currents or the voltages in order to store energy in energy storage elements such as batteries, for example as voltage [0-28 V].

The converters of existing storage solutions exhibit several drawbacks:
- these converters are dedicated, that is to say a converter is relevant to only one operating module of the airplane, thus taking up space and rendering them incompatible with other operating modules of the airplane,
- these converters do not make it possible to operate with high voltages,
- these converters do not make it possible to convert voltages into other voltages, especially between a voltage of the secondary network of an airplane and a storage element,
- these converters may not operate with an HVDC high-voltage DC network such as may exist in airplanes today since it is not floating, that is to say the negative potential of the converter is linked to the earth constituted by the airplane, thus increasing the common-mode voltages generated by the converter and not making it possible to electrically isolate the energy storage element, leaks from which may have repercussions on the operating modules of the airplane. For example, in the case of a short-circuit in the converter, especially of a transistor, the electrical network and the storage element may be impacted and develop a fault,
- these converters propose solutions with galvanic isolations of transformer type which are very penalizing from a mass and volume point of view for onboard equipment,
- these converters are not easy to rate in order to tailor the converter to the power to be transmitted,
- the demands for energy in an aircraft are significant and sporadic since they are related to ancillaries imposed, for example, by the flight controls or the landing gear.
- these converters comprise a large number of components,
- these converters do not offer any possibility of adjusting the control of the energy storage element's charge or discharge current.

In order to solve part of the drawbacks of the prior art, the invention proposes a module for converting between a high-voltage electrical network of an aircraft, especially a high-voltage DC network, and an energy storage element of said aircraft, especially a super-capacitor. The conversion module being able to reversibly perform a conversion between a DC voltage E of the high-voltage electrical network of the aircraft and a DC voltage $V_S$ of the aircraft storage element, the voltage $V_S$ of the aircraft storage element being lower and floating with respect to the voltage E of the high-voltage electrical network of the aircraft and centered with respect to the earth of the airplane, the module comprising an input module comprising two filters each able to receive a DC voltage E/2, a first arm and a second arm comprising switches, and control means for said switches, the control means operating by cycle of a switching period T and being able to control at least one first switch and at least one second switch in an identical manner but shifted by a half-period T/2 so that the first switch is open when the second switch is closed and vice versa.

This makes it possible especially:
- to ensure the charging and the discharging of the storage element;
- to secure the possible loss of the function by avoiding the uncontrolled charging and discharging of the energy storage element, for example in the high-voltage electrical network of the aircraft,
- to render the high-voltage electrical network of the aircraft floating. In particular, the energy storage element is not subjected to a common mode, that is to say the difference of potentials of the electrodes of the energy storage element with respect to the potential constituted by the airplane earth is constant. This allows isolation of the energy storage element and therefore makes it possible to avoid energy leaks especially;
- to store energy, involving energy-related optimization, for example by storing energy originating from electric actuators so as to return it later to the same actuators or to other actuators;
- to reduce the wiring in the aircraft by storing the energy in a localized manner so as to supply each operating module of the aircraft, thus avoiding distributed storages dedicated, for example, to each operating module of the airplane.

The potentials of the storage element are fixed by centering them with respect to the earth of the airplane, the effect of which is to isolate the storage element from the high-voltage electrical network of the aircraft whose elements are also linked to the airplane earth. This makes it possible moreover to render the aircraft's electrical network high-voltage.

Such a module exhibits a topology of interleaved, non-isolated, multi-level converters, with fixed output potential.

Such a module furthermore makes it possible especially:
- to use transistors, the transistors forming the switches of the conversion module, of low voltage,
- to reduce the size of the input filters which are able to receive half the voltage, for example by increasing the number of arms in parallel, an arm being formed of two half-bridges,
- to reduce the size of the output filters,
- to use components with lower voltage helping to optimize efficiency, especially with better performance in terms of conduction and switching,
- to reduce the duty ratio and therefore the voltage across the terminals of the switches, especially across the terminals of the transistors forming the switches of the conversion module. For example, when the duty ratio is halved, the voltage applied to the terminals of the transistors is half that of the DC voltage E, i.e. E/2,
- to associate cells in parallel, few cells implying little volume of the conversion module and more cells implying more switched current and therefore to optimize the size and the efficiency of the conversion module,
- in the case of a short-circuit of a component, for example a transistor of a switch, to protect the energy storage element and to isolate it in relation to the voltage E of the electrical network. There is then no need for a protective element, for example a Solid State Power Controller (SSPC).

According to one aspect of the invention, the control means control switches ($k_1$, $k_{11}$, $k_{44}$, $k_4$, $k_3$, $k_{33}$, $k_{22}$, $k_2$), the input module comprises a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$, and a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0=0$ V. The first arm comprises four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_0$, the switch $k_{11}$ being situated between the point with potential $V_1$ and the point with potential $V_0$, the inductor $Ls_{11}$ being situated between the point with potential $V_0$ and a point with potential $V_4$, the switch $k_{44}$ being situated between the point with potential $V_0$ and the point with potential $V_4$, the switch $k_4$ being situated between the point with potential $V_4$ and the point with potential $V_B$, the control means for the switches being able simultaneously to maintain the switches $k_1$ and $k_4$ open and the switches $k_{11}$ and $k_{44}$ closed and vice versa, the voltage $V_S$ being measured between the point with potential $V_C$ and $V_0$. The second arm comprises four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_C$ and the point with potential $V_3$, the switch $k_{33}$ being situated between the point with potential $V_3$ and the point with potential $V_0$, the inductor $Ls_{22}$ being situated between the point with potential $V_0$ and a point with potential $V_2$, the switch $k_{22}$ being situated between the point with potential $V_0$ and the point with potential $V_2$, the switch $k_2$ being situated between the point with potential $V_2$ and the point with potential $V_B$, the control means for the switches being able simultaneously to maintain the switches $k_1$ and $k_4$ open and the switches $k_{11}$ and $k_{44}$ closed and vice versa, the voltage $V_S$ being measured between the point with potential $V_C$ and $V_0$. The control means control the switches $k_1$ and $k_4$ in an identical manner on the one hand and $k_2$ and $k_3$ in an identical manner on the other hand, the switches $k_1$ and $k_3$ being shifted by a half-period T/2 so that the switches $k_1$ and $k_4$ are open when the switches $k_2$ and $k_3$ are closed and vice versa.

This makes it possible especially:
to have an isolation voltage equal to half the voltage of the storage element or elements,
to reduce the number of ripples by half, implying especially less stress or strain on the components which thus experience an increase in their lifetime or indeed their efficiency.

According to one aspect of the invention, the control means control switches ($k_1$, $k_{11}$, $k_{22}$, $k_2$), the input module comprises a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$, and a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0=0$ V. The first arm comprises two switches ($k_1$, $k_{11}$) and an inductor $Ls_1$, the switch $k_1$ being situated between the point with potential $V_A$ and a point with potential $V_1$, the inductor $Ls_1$ being situated between the point with potential $V_1$ and a point with potential $V_{C1}$, the switch $k_{11}$ being situated between the point with potential $V_1$ and the point with potential $V_0$, the voltage $V_S$ being measured between the point with potential $V_{C1}$ and $V_0$, the control means for the switches being able simultaneously to maintain the switch $k_1$ open and the switch $k_{11}$ closed and vice versa, the voltage $V_S$ being measured between the point with potential $V_{C1}$ and $V_0$. The second arm comprises two switches ($k_2$, $k_{22}$) and an inductor $Ls_2$, the switch $k_2$ being situated between the point with potential $V_2$ and the point with potential $V_B$, the inductor $Ls_2$ being situated between the point with potential $V_2$ and a point with potential $V_{C2}$, the switch $k_{22}$ being situated between the point with potential $V_2$ and the point with potential $V_0$, the control means for the switches being able simultaneously to maintain the switch $k_2$ open and the switch $k_{22}$ closed and vice versa, the voltage $V_S$ being measured between the point with potential $V_{C2}$ and between the point with potential $V_0$. The control means control the switches $k_1$ and $k_2$ in an identical manner but shifted by a half-period T/2 so that the switch $k_1$ is open when the switch $k_2$ is closed and vice versa.

According to one aspect of the invention, the control means control switches ($k_1$, $k_{11}$, $k_{44}$, $k_4$, $k_3$, $k_{33}$, $k_{22}$, $k_2$), the input module comprises a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$, and a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0=0$ V. The first arm comprises four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_{C1}$, the switch $k_{11}$ being situated between the point with potential $V_1$ and the point with potential $V_0$, the inductor $Ls_{11}$ being situated between a point with potential $V_{C2}$ and a point with potential $V_4$, the switch $k_{44}$ being situated between the point with potential $V_0$ and the point with potential $V_4$, the switch $k_4$ being situated between the point with potential $V_4$ and the point with potential $V_B$, the control means for the switches being able simultaneously to maintain the switches $k_1$ and $k_4$ open and the switches $k_{11}$ and $k_{44}$ closed and vice versa, the voltage $V_S$ being measured between the point with potential $V_{C1}$ and between the point with potential $V_0$, and between the point with potential $V_0$ and the point with potential $V_{C2}$. The second arm comprises four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_3$ and the point with potential $V_{C1}$, the switch $k_{33}$ being situated between the point with potential $V_3$ and the point with potential $V_0$, the inductor $Ls_{22}$ being situated between the point with potential $V_2$ and a point with potential $V_{C2}$, the switch $k_{22}$ being situated between the point with potential $V_0$ and the point with potential $V_2$, the switch $k_2$ being situated between the point with potential $V_2$ and the point with potential $V_B$, the control means for the switches being able simultaneously to maintain the switches $k_1$ and $k_4$ open and the switches $k_{11}$ and $k_{44}$ closed and vice versa, the voltage $V_S$ being measured between the point with potential $V_{C1}$ and between the point with potential $V_0$, and between the point with potential $V_0$ and the point with potential $V_{C2}$. The control means controlling the switches $k_1$ and $k_4$ in an identical manner on the one hand and $k_2$ and $k_3$ in an identical manner on the other hand, $k_1$ and $k_3$ being shifted by a half-period T/2 so that the switches $k_1$ and $k_4$ are open when the switches $k_2$ and $k_3$ are closed and vice versa.

According to one aspect of the invention, E=270 or 540 V and $60 \leq V_S \leq 120$ V.

The invention also relates to a storage system.

The storage system comprises a conversion module such as defined hereinabove and at least one storage element connected between the points with potential corresponding to the voltage $V_S$.

According to one aspect of the invention, a storage element is connected between the points with potential $V_C$ and $V_0$.

According to one aspect of the invention, a first storage element is connected between the points with potential $V_{C1}$ and $V_0$ and a second storage element is connected between the points with potential $V_0$ and $V_{C2}$.

According to one aspect of the invention, the storage element is a super-capacitor.

This makes it possible to have especially a relatively lightweight energy storage element with fast restitution of energy, for example, with respect to a battery. This also makes it possible to have a higher energy density and less volume than a conventional electrolytic condenser.

According to one aspect of the invention, the super-capacitor is configured to store energy when an input voltage $V_S$ is applied to it, with $60 \leq V_S \leq 120$ V.

According to one aspect of the invention, the storage element is a battery.

This makes it possible especially to have a high energy density and therefore high autonomy.

According to one aspect of the invention, the battery is configured to store energy when an input voltage $V_S$ is applied to it, with $60 < V_S < 120$ V.

The invention also relates to a method of voltage conversion.

The method of converting voltage, between a high-voltage electrical network of an aircraft, especially a high-voltage DC network, and at least one energy storage element of said aircraft, especially a super-capacitor, comprises a reversible step of conversion between a voltage E of the high-voltage electrical network of the aircraft and a voltage $V_S$ of the energy storage element of the aircraft, said voltage $V_S$ of the energy storage element of the aircraft being isolated from the voltage E of the high-voltage electrical network of the aircraft and less than the voltage E of the high-voltage electrical network of the aircraft.

An embodiment of the invention will now be described in greater detail, by way of nonlimiting example, with reference to the appended drawings in which.

Figure 1:
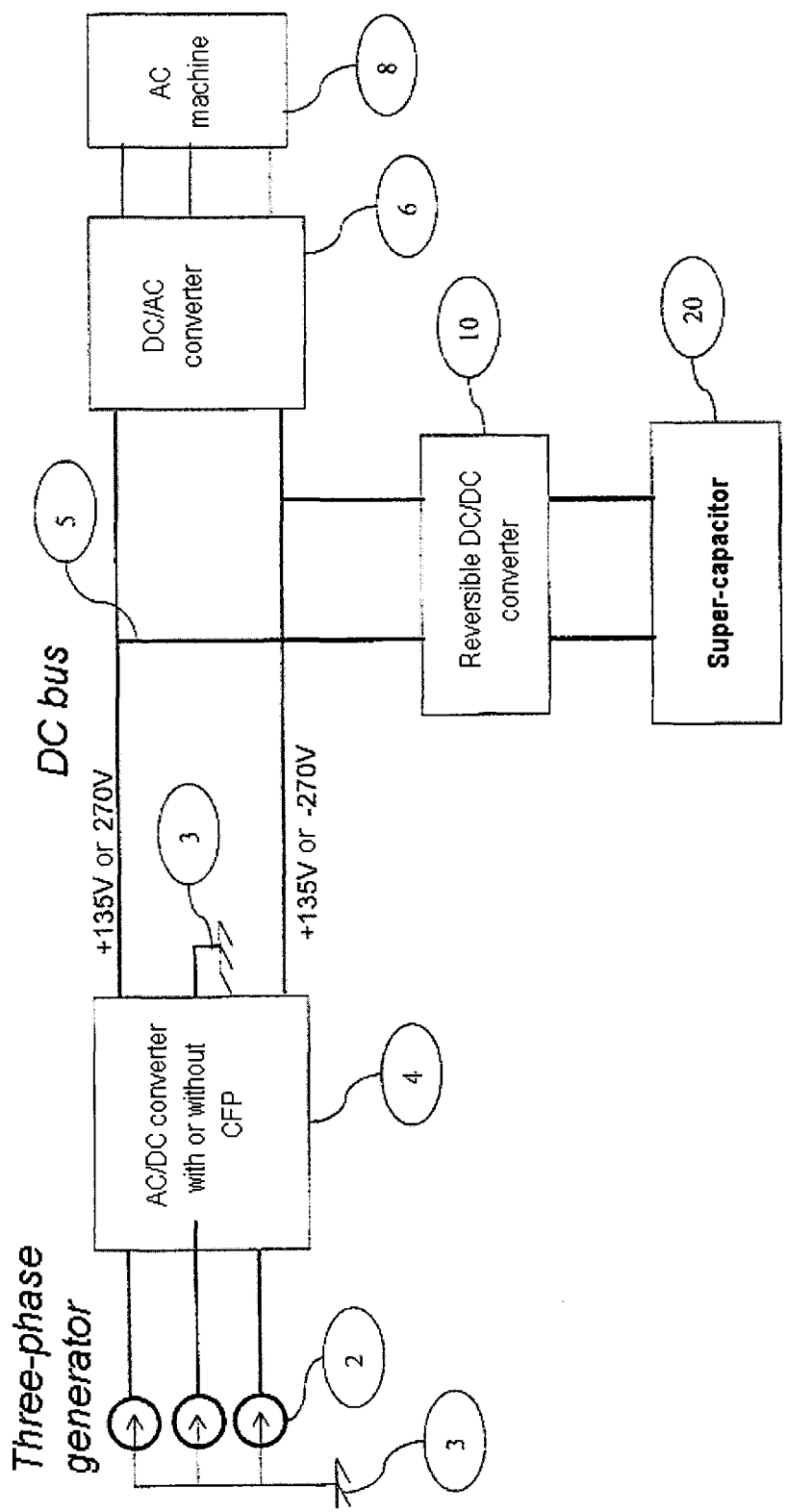
FIG. 1 represents an electrical system comprising a high-voltage electrical network, a voltage conversion module and a storage element.

FIG. 1 represents an electrical system comprising several modules. The system comprises an AC voltage high-voltage electrical network 2, comprising for example a three-phase generator, a point of which is linked to earth 3. The system also comprises an AC/DC conversion module (or converter) 4 which makes it possible to convert an AC voltage of a high-voltage electrical network 2 into a DC voltage of a high-voltage DC network (or bus) 5. The system also comprises an AC machine 8, for example an electric motor, and a DC/AC converter 6 to which the AC machine 8 is connected. The DC/AC converter 6 makes it possible, in the energy restitution phases, to convert the AC voltage of the AC machine 8 into a DC voltage of the high-voltage DC network (or bus) 5. The system also comprises a voltage conversion module 10 making it possible to convert a voltage of the high-voltage DC network 5 into a voltage of an energy storage super-capacitor 20 of the aircraft. The conversion module 10 is able to reversibly perform a conversion between a DC voltage E of the high-voltage DC network 5 and a DC voltage $V_S$ of the super-capacitor 20, the DC voltage $V_S$ of the aircraft storage element being floating with respect to the DC voltage E of the high-voltage DC network 5. The term "reversibly" should be understood as meaning that the conversion module 10 is able to convert a DC voltage E of the high-voltage DC network 5 into a DC voltage $V_S$ of the super-capacitor 20 and conversely a DC voltage $V_S$ of the super-capacitor 20 into a DC voltage E of the high-voltage DC network 5.

Figure 2:
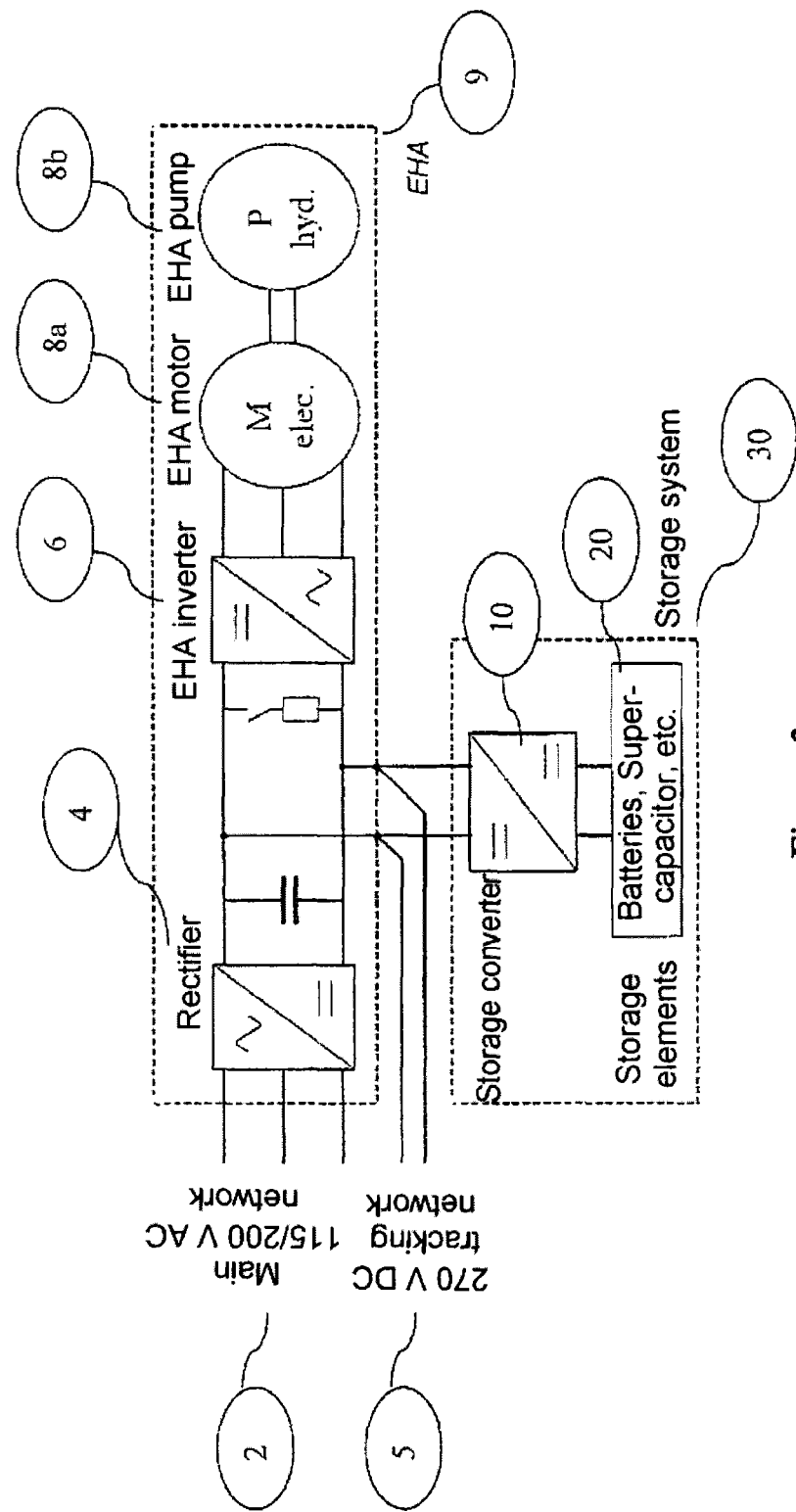
FIG. 2 represents an electrical system of an aircraft comprising a high-voltage electrical network, a voltage conversion module and a storage element.

FIG. 2 describes an electrical system of an aircraft comprising several modules. The main electrical network 2 operates under AC current at AC voltages of 115/200 V. A rectifier 4 makes it possible to convert these voltages into DC voltages of the 270-V DC secondary network or backup network 5 (or high-voltage DC network (or bus) 5). A hydraulic pump 8b is connected to an electric motor 8a operating under AC voltages. The electric motor 8a is connected to an inverter 6 which transforms the AC voltages into DC voltages of the 270-V DC backup network 5. The storage system 30 comprises a conversion module 10 (or converter) linked on the one hand, by two connections, to one or more energy storage elements 20 such as batteries or super-capacitors, and linked on the other hand by two electrical leads or connections respectively to the points with potentials +270 V and −270 V of the 270-V DC backup network 5.

Figure 3:
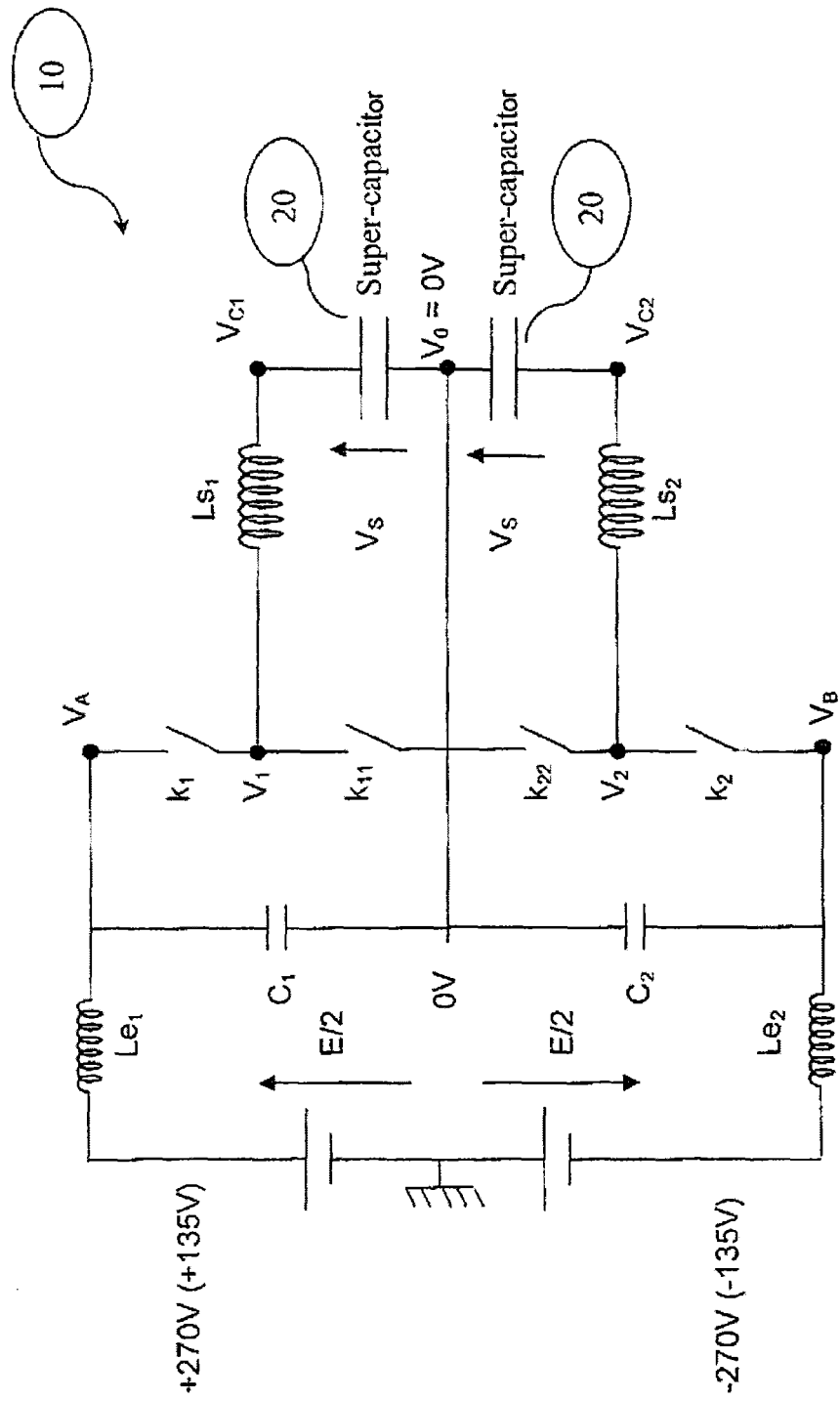
FIG. 3 represents a voltage conversion module linked to a storage element.
Figure 4:
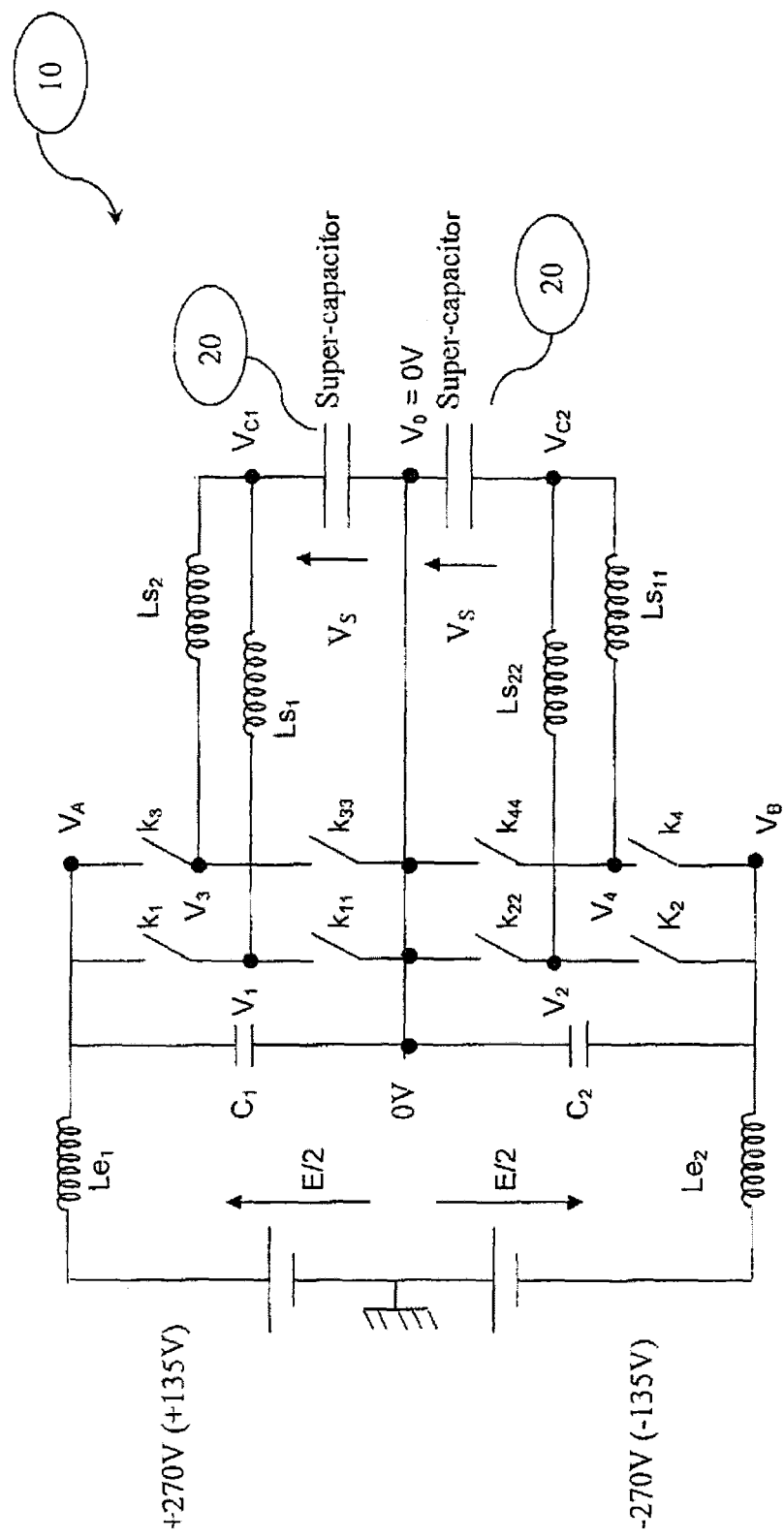
FIG. 4 represents a voltage conversion module linked to a storage element.
Figure 5:
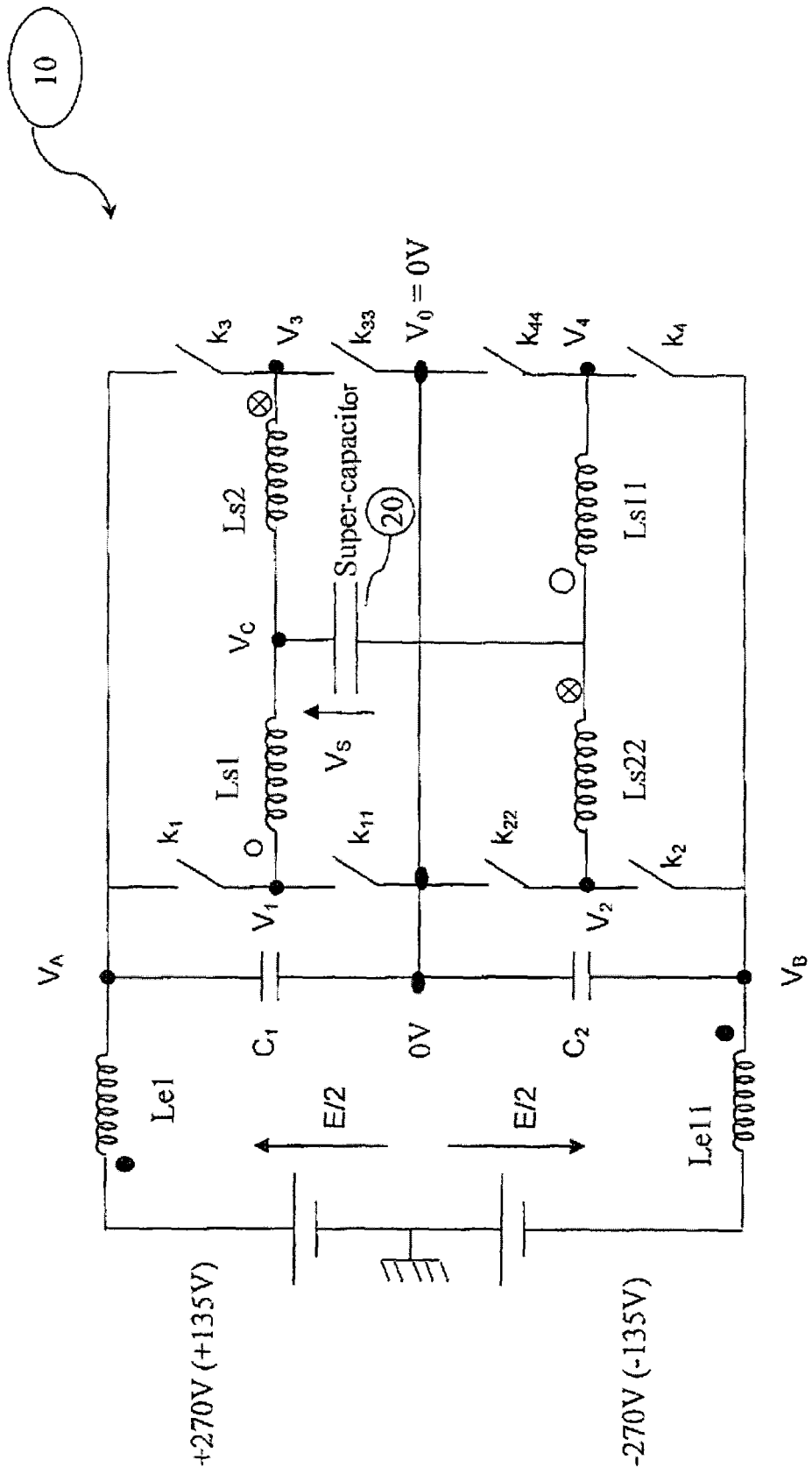
FIG. 5 represents a voltage conversion module linked to a storage element.

FIGS. 3 to 5 represent three embodiments of a conversion module 10. Such a module 10 for converting between the voltages E and $V_S$ comprises:
 an input module comprising two input filters, each able to receive a DC voltage E/2,
 a first arm and a second arm comprising switches formed of transistors, and
 control means for said switches, the control means operating by cycle of a switching period T and being able to control at least one first switch and at least one second switch in an identical manner but shifted by a half-period T/2 so that the first switch is open when the second switch is closed and vice versa.

In all the embodiments of the invention described in FIGS. 3 to 5, cells each formed of a first and of a second arm can be associated in parallel, especially so as to increase the power to be transmitted. An arm consists of two half-bridges. For example, with reference to FIGS. 4 and 5 hereinbelow, the transistors $k_1$ and $k_{11}$ form a half-bridge and the transistors $k_1$, $k_{11}$, $k_{44}$, $k_4$ form an arm.

The assembly formed by the input filters of the cells is then rated for a frequency equal to the number of cells, multiplied by the switching frequency of the transistors.

For a 270V (135/−135V) network, 300V Mosfet technology transistors can be used. For a 540V (270/−270V) network, 600V Mosfet transistors or Igbts (with antiparallel diode) may be used. By choosing one or other of these, it is possible to tailor the power of the conversion module.

FIG. 3 represents a module 10 for converting between the voltages E and V.

The control means control switches ($k_1$, $k_{11}$, $k_{22}$, $k_2$).

The input module comprises a first filter comprising a first input terminal and a second input terminal which is linked to the airplane earth, for the application of a first voltage E/2, a first inductor $Le_1$ and a capacitor $C_1$, the inductor $Le_1$ and the capacitor $C_1$ being joined to a point with potential $V_A$.

The input module also comprises a second filter comprising a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$.

The capacitors $C_1$ and $C_2$ are joined to a point with potential $V_0$=0 V.

The first arm comprises two switches ($k_1$, $k_{11}$) and an inductor $Ls_1$, the switch $k_1$ being situated between the point with potential $V_A$ and a point with potential $V_1$, the inductor $Ls_1$ being situated between the point with potential $V_1$ and a point with potential $V_{C1}$, the switch $k_{11}$ being situated between the point with potential $V_1$ and the point with potential $V_0$, the voltage $V_S$ being measured between the point with potential $V_{C1}$ and $V_0$, the control means for the switches being able simultaneously to maintain the switch $k_1$ open and the switch $k_{11}$ closed and vice versa, the voltage $V_S$ being measured between the point with potential $V_{C1}$ and $V_0$.

The second arm comprises two switches ($k_2$, $k_{22}$) and an inductor $Ls_2$, the switch $k_2$ being situated between the point with potential $V_2$ and the point with potential $V_B$, the inductor $Ls_2$ being situated between the point with potential $V_2$ and a point with potential $V_{C2}$, the switch $k_{22}$ being situated between the point with potential $V_2$ and the point with potential $V_0$, the control means for the switches being able simultaneously to maintain the switch $k_2$ open and the switch $k_{22}$ closed and vice versa, the voltage $V_S$ being measured between the point with potential $V_{C2}$ and between the point with potential $V_0$.

The control means control the switches $k_1$ and $k_2$ in an identical manner but shifted by a half-period T/2 so that the switch $k_1$ is open when the switch $k_2$ is closed and vice versa. Thus the first and the second arm are used alternately on each switching half-period T/2.

In this embodiment of the invention, the duty ratio is doubled, the voltage of the transistors is halved, cells can be associated in parallel and the isolation voltage is equal to that of the super-capacitors 20.

FIG. 4 represents a module 10 for converting between the voltages E and $V_S$.

The control means control switches ($k_1$, $k_{11}$, $k_{44}$, $k_4$, $k_3$, $k_{33}$, $k_{22}$, $k_2$). The input module comprises a first filter comprising a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$.

The input module also comprises a second filter comprising a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0$=0 V.

The first arm comprises four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_1$, the switch $k_{11}$ being situated between the point with potential $V_1$ and the point with potential $V_0$, the inductor $Ls_1$ being situated between a point with potential $V_{C2}$ and a point with potential $V_4$, the switch $k_{44}$ being situated between the point with potential $V_0$ and the point with potential $V_4$, the switch $k_4$ being situated between the point with potential $V_4$ and the point with potential $V_B$, the control means for the switches being able simultaneously to maintain the switches $k_1$ and $k_4$ open and the switches $k_{11}$ and $k_{44}$ closed and vice versa, a voltage $V_S$ being measured between the point with potential $V_C$, and between the point with potential $V_0$, and a voltage $V_S$ being measured between the point with potential $V_0$ and the point with potential $V_{C2}$.

The second arm comprises four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_3$ and the point with potential $V_{C1}$, the switch $k_{33}$ being situated between the point with potential $V_3$ and the point with potential $V_0$, the inductor $Ls_{22}$ being situated between the point with potential $V_2$ and a point with potential $V_{C2}$, the switch $k_{22}$ being situated between the point with potential $V_0$ and the point with potential $V_2$, the switch $k_2$ being situated between the point with potential $V_2$ and the point with potential $V_B$, the control means for the switches being able simultaneously to maintain the switches $k_1$ and $k_4$ open and the switches $k_{11}$ and $k_{44}$ closed and vice versa, the voltage $V_S$ being measured between the point with potential $V_{C1}$ and between the point with potential $V_0$, and between the point with potential $V_0$ and the point with potential $V_{C2}$.

The control means control the switches ($k_1$, $k_{11}$, $k_{44}$, $k_4$, $k_3$, $k_{33}$, $k_{22}$, $k_2$) so that the first arm and the second arm are used alternately on each switching half-period T/2. The switches forming the half-bridges [$k_i$, $k_{ii}$] (1≤i≤4) are controlled in a complementary manner. Likewise, especially to reduce the size of the passive elements, the controls of the switches $k_1$ and $k_3$, respectively $k_2$ and $k_4$, are complementary, shifted by a half-period. The switches $k_1$ and $k_4$, respectively $k_2$ and $k_3$, are controlled in an identical manner. Stated otherwise, the control means controlling the switches $k_1$ and $k_4$ in an identical manner on the one hand and $k_2$ and $k_3$ in an identical manner on the other hand, $k_1$ and $k_3$ being shifted by a half-period T/2 so that the switches $k_1$ and $k_4$ are open when the switches $k_2$ and $k_3$ are closed and vice versa.

In this embodiment of the invention, the duty ratio is doubled, the voltage of the transistors is halved, cells can be associated in parallel and the isolation voltage is equal to that of the super-capacitors 20.

FIG. 5 represents a module 10 for converting between the voltages E and $V_S$.

The conversion module 10 comprises control means controlling the switches ($k_1$, $k_{11}$, $k_{44}$, $k_4$, $k_3$, $k_{33}$, $k_{22}$, $k_2$).

The input module comprises a first filter comprising a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$.

The input module also comprises a second filter comprising a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$.

The capacitors $C_1$ and $C_2$ are joined to a point with potential $V_0=0$ V.

The first arm comprises four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_C$, the switch $k_{11}$ being situated between the point with potential $V_1$ and the point with potential $V_0$, the inductor $Ls_{11}$ being situated between the point with potential $V_0$ and a point with potential $V_4$, the switch $k_{44}$ being situated between the point with potential $V_0$ and the point with potential $V_4$, the switch $k_4$ being situated between the point with potential $V_4$ and the point with potential $V_B$. The control means for the switches are able simultaneously to maintain the switches $k_1$ and $k_4$ open and the switches $k_{11}$ and $k_{44}$ closed and vice versa. The voltage $V_S$ is measured between the point with potential $V_C$ and $V_0$.

The second arm comprises four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_C$ and the point with potential $V_3$, the switch $k_{33}$ being situated between the point with potential $V_3$ and the point with potential $V_0$, the inductor $Ls_{22}$ being situated between the point with potential $V_0$ and a point with potential $V_2$, the switch $k_{22}$ being situated between the point with potential $V_0$ and the point with potential $V_2$, the switch $k_2$ being situated between the point with potential $V_2$ and the point with potential $V_B$. The control means for the switches are able simultaneously to maintain the switches $k_1$ and $k_4$ open and the switches $k_{11}$ and $k_{44}$ closed and vice versa. The voltage $V_S$ is measured between the point with potential $V_C$ and $V_0$.

The control means control the switches ($k_1$, $k_{11}$, $k_{44}$, $k_4$, $k_3$, $k_{33}$, $k_{22}$, $k_2$) so that the first arm and the second arm are used alternately on each switching half-period T/2. The switches forming the half-bridges $[k_i, k_{ii}]$ ($1 \le i \le 4$) are controlled in a complementary manner. Likewise, especially to reduce the size of the passive elements, the controls of the switches $k_1$ and $k_3$, respectively $k_2$ and $k_4$, are complementary, shifted by a half-period. The switches $k_1$ and $k_4$, respectively $k_2$ and $k_3$, are controlled in an identical manner.

Denoting by dT the conduction time of the transistors $k_1$ and by T the switching period, to a first approximation, neglecting the ohmic voltage drops of the components, the relation between the voltage of the super-capacitor and the voltage of the network is VS=d*E. As a function of the voltage level of the super-capacitor, adjusting d makes it possible to control the charge or discharge current. d varies as the ratio Vs/E, that is to say, for example, for E=270 V and $0<Vs\le 120$, then d varies between 60/270 and 120/270. Voltage control of the midpoint 0V is optionally necessary. The variation of d can be effected, for example, on the basis of a Pulse Width Modulation (PWM) module in analog or digital.

The conversion module 10 thus consisting of two arms, the rating frequency of the filters corresponds to twice the switching frequency of the transistors of the switches of said arms.

In this embodiment of the invention, the duty ratio is doubled, the voltage of the transistors is halved, cells can be associated in parallel and the isolation voltage is equal to that of the super-capacitor 20 halved.

The invention claimed is:

1. A module for converting voltage between a high-voltage electrical network of an aircraft, and at least one energy storage element of said aircraft, said conversion module being able to reversibly perform a conversion between a DC voltage E of the high-voltage electrical network of the aircraft and a DC voltage $V_S$ of the energy storage element of the aircraft, said voltage $V_S$ of the aircraft storage element being floating with respect to the voltage E of the high-voltage electrical network of the aircraft and centered with respect to the earth of the aircraft, the module comprising:
   an input module, comprising two filters each able to receive a DC voltage E/2,
   a first arm and a second arm comprising switches, and
   a controller configured to control said switches, the controller operating by cycle of a switching period T and being configured to control at least one first switch of the first arm and at least one first switch of the second arm and at least one second switch in an identical manner but shifted by a half-period T/2 so that the first switches are open when the second switches are closed and vice versa.

2. The module as claimed in claim 1, in which the controller is configured to control switches ($k_1$, $k_{11}$, $k_{44}$, $k_4$, $k_3$, $k_{33}$, $k_{22}$, $k_2$) and in which:
   the input module comprises:
   i. a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$,
   ii. a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0=0$ V,
   the first arm comprises four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_C$, the switch $k_{11}$ being situated between the point with potential $V_1$ and the point with potential $V_0$, the inductor $Ls_{11}$ being situated between the point with potential $V_0$ and a point with potential $V_4$, the switch $k_{44}$ being situated between the point with potential $V_0$ and the point with potential $V_4$, the switch $k_4$ being situated between the point with potential $V_4$ and the point with potential $V_B$, the controller configured to control the switches being configured simultaneously to maintain the switches $k_1$ and $k_4$ open and the switches $k_{11}$ and $k_{44}$ closed and vice versa, the voltage $V_S$ being measured between the point with potential $V_C$ and $V_0$;
   the second arm comprises four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_C$ and the point with potential $V_3$, the switch $k_{33}$ being situated between the point with potential $V_3$ and the point with potential $V_0$, the inductor $Ls_{22}$ being situated between the point with potential $V_0$ and a point with potential $V_2$, the switch $k_{22}$ being situated between the point with potential $V_0$ and the point with potential $V_2$, the switch $k_2$ being situated between the point with potential $V_2$ and the point with potential $V_B$, the controller configured to control the switches being configured simultaneously to maintain the switches $k_1$ and $k_4$ open and the switches $k_{11}$ and $k_{44}$ closed and vice versa, the voltage $V_S$ being measured between the point with potential $V_C$ and $V_0$, and the controller configured to control the switches $k_1$ and $k_4$ in an identical manner on the one hand and $k_2$ and $k_3$ in an identical manner on the other hand, the switches $k_1$ and $k_3$ being shifted by a half-period T/2 so that the switches $k_1$ and $k_4$ are open when the switches $k_2$ and $k_3$ are closed and vice versa.

3. The module as claimed in claim 1, in which the controller is configured to control switches ($k_1$, $k_{11}$, $k_{22}$, $k_2$) and in which:

the input module comprises:
i. a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$,
ii. a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0$=0 V, the first arm comprises two switches ($k_1$, $k_{11}$) and an inductor $Ls_1$, the switch $k_1$ being situated between the point with potential $V_A$ and a point with potential $V_1$, the inductor $Ls_1$ being situated between the point with potential $V_1$ and a point with potential $V_{C1}$, the switch $k_{11}$ being situated between the point with potential $V_1$ and the point with potential $V_0$, the voltage $V_S$ being measured between the point with potential $V_{C1}$ and $V_0$, the controller configured to control the switches being configured simultaneously to maintain the switch $k_1$ open and the switch $k_{11}$ closed and vice versa, the voltage $V_S$ being measured between the point with potential $V_{C1}$ and $V_0$, the second arm comprises two switches ($k_2$, $k_{22}$) and an inductor $Ls_2$, the switch $k_2$ being situated between the point with potential $V_2$ and the point with potential $V_B$, the inductor $Ls_2$ being situated between the point with potential $V_2$ and a point with potential $V_{C2}$, the switch $k_{22}$ being situated between the point with potential $V_2$ and the point with potential $V_0$, the controller configured to control the switches being configured simultaneously to maintain the switch $k_2$ open and the switch $k_{22}$ closed and vice versa, the voltage $V_S$ being measured between the point with potential $V_{C2}$ and between the point with potential $V_0$, and the controller configured to control the switches $k_1$ and $k_2$ in an identical manner but shifted by a half-period T/2 so that the switch $k_1$ is open when the switch $k_2$ is closed and vice versa.

4. The module as claimed in claim 1, in which the controller configured to control switches ($k_1$, $k_{11}$, $k_{44}$, $k_4$, $k_3$, $k_{33}$, $k_{22}$, $k_2$) and in which:

the input module comprises:
i. a first input terminal and a second input terminal which is linked to earth, for the application of a first voltage E/2, a first inductor $Le_1$ and a capacitor $C_1$, the inductor $Le_1$ and the capacitor $C_1$ being joined to a point with potential $V_A$,
ii. a third input terminal and the second input terminal which is linked to earth, for the application of a first voltage E/2, a second inductor $Le_2$ and a capacitor $C_2$, the inductor $Le_2$ and the capacitor $C_2$ being joined to a point with potential $V_B$, the capacitors $C_1$ and $C_2$ being joined to a point with potential $V_0$=0 V, the first arm comprising four switches ($k_1$, $k_{11}$, $k_{44}$, $k_4$) and two inductors ($Ls_1$, $Ls_{11}$), the switch $k_1$ being situated between the point with potential $V_A$ and a point with potential $V_1$, the inductor $Ls_1$ being situated between the point with potential $V_1$ and a point with potential $V_{C1}$, the switch $k_{11}$ being situated between the point with potential $V_1$ and the point with potential $V_0$, the inductor $Ls_{11}$ being situated between a point with potential $V_{C2}$ and a point with potential $V_4$, the switch $k_{44}$ being situated between the point with potential $V_0$ and the point with potential $V_4$, the switch $k_4$ being situated between the point with potential $V_4$ and the point with potential $V_B$, the controller configured to control the switches being configured simultaneously to maintain the switches $k_1$ and $k_4$ open and the switches $k_{11}$ and $k_{44}$ closed and vice versa, the voltage $V_S$ being measured between the point with potential $V_{C1}$ and between the point with potential $V_0$, and between the point with potential $V_0$ and the point with potential $V_{C2}$;

the second arm comprising four switches ($k_3$, $k_{33}$, $k_{22}$, $k_2$) and two inductors ($Ls_2$, $Ls_{22}$), the switch $k_3$ being situated between the point with potential $V_A$ and a point with potential $V_3$, the inductor $Ls_2$ being situated between the point with potential $V_3$ and the point with potential $V_{C1}$, the switch $k_{33}$ being situated between the point with potential $V_3$ and the point with potential $V_0$, the inductor $Ls_{22}$ being situated between the point with potential $V_2$ and a point with potential $V_{C2}$, the switch $k_{22}$ being situated between the point with potential $V_0$ and the point with potential $V_2$, the switch $k_2$ being situated between the point with potential $V_2$ and the point with potential $V_B$, the controller configured to control the switches being configured simultaneously to maintain the switches $k_1$ and $k_4$ open and the switches $k_{11}$ and $k_{44}$ closed and vice versa, the voltage $V_S$ being measured between the point with potential $V_{C1}$ and between the point with potential $V_0$, and between the point with potential $V_0$ and the point with potential $V_{C2}$, and the controller being configured to control the switches $k_1$ and $k_4$ in an identical manner on the one hand and $k_2$ and $k_3$ in an identical manner on the other hand, $k_1$ and $k_3$ being shifted by a half-period T/2 so that the switches $k_1$ and $k_4$ are open when the switches $k_2$ and $k_3$ are closed and vice versa.

5. The module as claimed in claim 1, in which E=270 or 540 V and 60<$V_S$<120V.

6. A storage system comprising a conversion module as claimed in claim 1 and at least one storage element connected between the points with potential corresponding to the voltage $V_S$.

7. The storage system as claimed in claim 6, in which a storage element is connected between the points with potential $V_C$ and $V_0$.

8. The storage system as claimed in claim 6, in which a first storage element is connected between the points with potential $V_{C1}$ and $V_0$ and a second storage element is connected between the points with potential $V_0$ and $V_{C2}$.

9. The system as claimed in claim 6, in which the storage element is a super-capacitor.

10. The system as claimed in claim 9, in which the super-capacitor is configured to store energy when an input voltage $V_S$ is applied to it, with 60≤$V_S$≤120 V.

11. The system as claimed in claim 6, in which the storage element is a battery.

12. The system as claimed in claim 11, in which the battery is configured to store energy when an input voltage $V_S$ is applied to it, with $60 \leq V_S \leq 120$ V.

* * * * *